US005933097A

United States Patent [19]

Sakurai et al.

[11] Patent Number: 5,933,097

[45] Date of Patent: Aug. 3, 1999

[54] METHOD FOR ADJUSTING A THRESHOLD VALUE OF A VEHICLE-MOUNTED DEVICE EMPLOYED IN AN AUTOMATIC TOLL-COLLECTING SYSTEM

[75] Inventors: Takashi Sakurai, Nagoya; Ichiro Yoshida, Takahama, both of Japan

[73] Assignee: Denso Corporation, Kariya, Japan

[21] Appl. No.: 09/083,103

[22] Filed: May 22, 1998

[30] Foreign Application Priority Data

May 26, 1997 [JP] Japan .................................... 9-135429

[51] Int. Cl.[6] ................................ G08B 1/00; H04B 1/40

[52] U.S. Cl. .......................... 340/928; 340/901; 340/905; 340/825.54; 235/384; 455/87; 455/575; 455/152.1

[58] Field of Search ..................................... 340/928, 901, 340/905, 539, 425.5, 825.54; 455/87, 99, 77, 134, 151.3, 152.1, 517, 575, 226.1, 234.2, 249.1, 250.1, 88; 235/384, 375

[56] References Cited

U.S. PATENT DOCUMENTS 4,870,419 9/1989 Baldwin et al. ................... 340/825.54
5,386,589 1/1995 Kanai ..................................... 455/33.1
5,613,230 3/1997 Gottfried et al. .................... 455/161.3
5,686,920 11/1997 Hurta et al. ............................... 342/42
5,790,940 8/1998 Laborde et al. ........................ 455/126

FOREIGN PATENT DOCUMENTS 8-221622 8/1996 Japan .

*Primary Examiner*—Donnie L. Crosland
*Attorney, Agent, or Firm*—Pillsbury, Madison & Sutro LLP

[57] ABSTRACT

A vehicle-mounted device that enables adjustment by wireless communication from an external portion, of a threshold value employed for detecting strength of a radio wave emitted from a roadside device. A vehicle-mounted device is disposed within an electromagnetic-shield box, and radio waves for activating use are sent from an antenna within the electromagnetic-shield box to the vehicle-mounted device. The vehicle-mounted device, when activated by this radio wave for activating use, sends an activation acknowledgement signal. A computer determines whether the vehicle-mounted device has been activated according to the presence or absence of the activation acknowledgement signal. The computer sends a radio wave from the antenna to the vehicle-mounted device to set a threshold value in correspondence to the presence or absence of this activation, and sets the threshold value of the vehicle-mounted device. These operations are performed repeatedly to adjust the threshold value of the vehicle-mounted device to an appropriate value.

31 Claims, 6 Drawing Sheets

METHOD FOR ADJUSTING A THRESHOLD VALUE OF A VEHICLE-MOUNTED DEVICE EMPLOYED IN AN AUTOMATIC TOLL-COLLECTING SYSTEM

CROSS-REFERENCE TO RELATED APPLICATION

The present application is related to and claims priority from Japanese Patent Application No. Hei 9-135429, filed on May 26, 1997, the contents of which are hereby incorporated by reference.

BACKGROUND OF THE INVENTION

1. Field of the Invention

This invention relates to a method for adjusting a threshold value of a vehicle-mounted device employed in an automatic toll-collecting system to perform automatic collection of a traffic toll, a vehicle-mounted device structured so as to perform adjustment of the threshold value thereof, and a threshold-value adjusting device for performing the threshold-value adjustment.

2. Description of Related Art

Various automatic toll-collecting systems have been proposed for performing automatic collection of a traffic toll via transmission of radio waves between a roadside device and a vehicle-mounted device.

The vehicle-mounted device employed in this automatic toll-collecting system is activated solely within a communication area formed by the roadside device, so that communication with the roadside device is completed within this communication area, to suppress communication interference and reduce power consumption. Specifically, the vehicle-mounted device is provided with an electric field-strength detecting circuit to detect the strength of radio waves emitted from the roadside device. Further, the device is designed to be activated and begin communication with the roadside device when the field-strength value reaches a predetermined threshold value, to ensure sufficient communication quality.

However, when fluctuations occur in the above-described threshold value, the quality of communication declines, and power consumption of the vehicle-mounted device becomes large. For example, when the threshold value is set higher than an appropriate value, the timing with which entry of the vehicle-mounted device into the communication area is detected is delayed, and the communication area is shortened. When the communication area is shortened in this way, the time with which the vehicle-mounted device can communicate with the roadside device is shortened. Therefore, cases wherein communication is not completed may occur. Additionally, when the threshold value is set at an extremely high value, the communication area may not be detected, even when the vehicle-mounted device passes under the roadside device. Thus, communication with the roadside device cannot be performed.

Conversely, when the threshold value is set lower than the appropriate value, background-noise radio waves are detected, and the vehicle-mounted device may be activated even at a location outside the communication area. Therefore,there is a chance that communication interference may occur. Additionally, power consumption of the vehicle-mounted device increases, and, in a case wherein a dry-cell battery is employed as the power source of the vehicle-mounted device, the battery may be expended prematurely.

In this regard, a method may be considered wherein the threshold value of the field-strength detecting circuit is set with a variable resistor. The resistance of the variable resistor is adjusted manually, and threshold-value adjustment is performed so that each vehicle-mounted device can detect the set field strength. However, fine adjustment of the sensitivity of the field-strength detecting circuit is necessary, thereby representing a significant design problem. Furthermore, this sensitivity adjustment must be performed before case assembly, and so the possibility exists that sensitivity may be affected by the case after case assembly.

SUMMARY OF THE INVENTION

In light of the above-mentioned problems, it is an object of this invention to enable adjustment, radio wave detection device of a threshold value, employed for detecting strength of a radio wave emitted from a roadside device, by wireless communication with an external device.

In particular, the present invention provides a method of controlling communication between components in an automatic toll-collecting system. A vehicle-mounted device that is activated upon receipt of activating signals at or above a threshold signal level is provided, along with a roadside device that selectively communicates with the vehicle-mounted device, and that includes a threshold-value adjusting device that is capable of adjusting the threshold signal level of the vehicle-mounted device. An activating signal is sent from the roadside device to the vehicle-mounted device when the vehicle-mounted device is within a predetermined range of the roadside device. The threshold level of the vehicle-mounted device is selectively adjusted based on the step of sending an activating signal. Finally, a toll collecting signal, having a signal level closely corresponding to the adjusted threshold level of the vehicle-mounted device, is sent from the roadside device to the vehicle-mounted device. Therefore, signal reliability and transmission quality is ensured.

The present invention also comprises an automatic toll collection system. The system includes a toll collecting device that transmits a toll fare communication signal. Also, a vehicle-mounted device communicates with the toll collecting device when the communication signal is at or above a predetermined threshold level. In addition, a threshold value setting device is associated with the toll collecting device, and adjusts the threshold level of the vehicle-mounted device based on a level of the toll fare communication signal. The system components thereby operate via a predetermined signal protocol to ensure accurate transmission and receipt of information by the system components.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

An embodiment of this invention will be described hereinafter with reference to the drawings.

Figure 2:
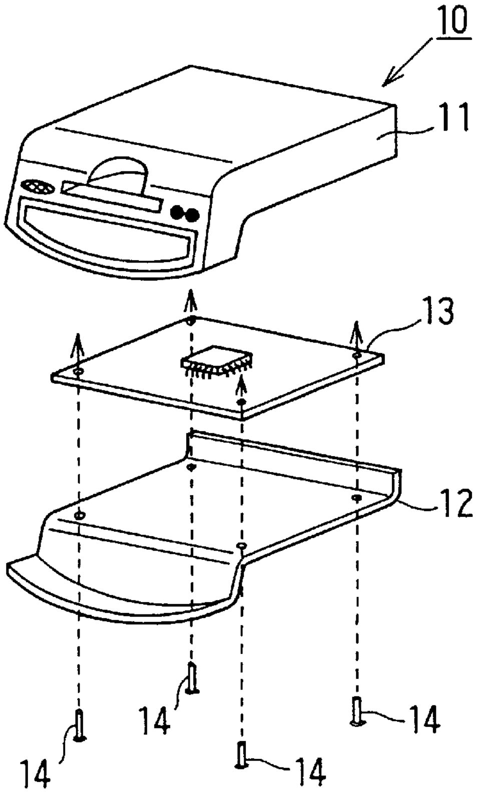
FIG. 2 is an exploded view of a vehicle-mounted device according to the first embodiment of this invention.

FIG. 2 shows an assembly structural view of a vehicle-mounted device 10. A case for the vehicle-mounted device 10 is made up of an upper case 11 and a lower case 12. The upper case 11 and the lower case 12 are fitted together so as to house a circuit board 13. Accordingly, the upper case 11 and the lower case 12 are joined by screws 14 to make up the vehicle-mounted device 10. This vehicle-mounted device 10 is disposed on the dashboard or the inner side of a vehicle windshield.

Figure 1:
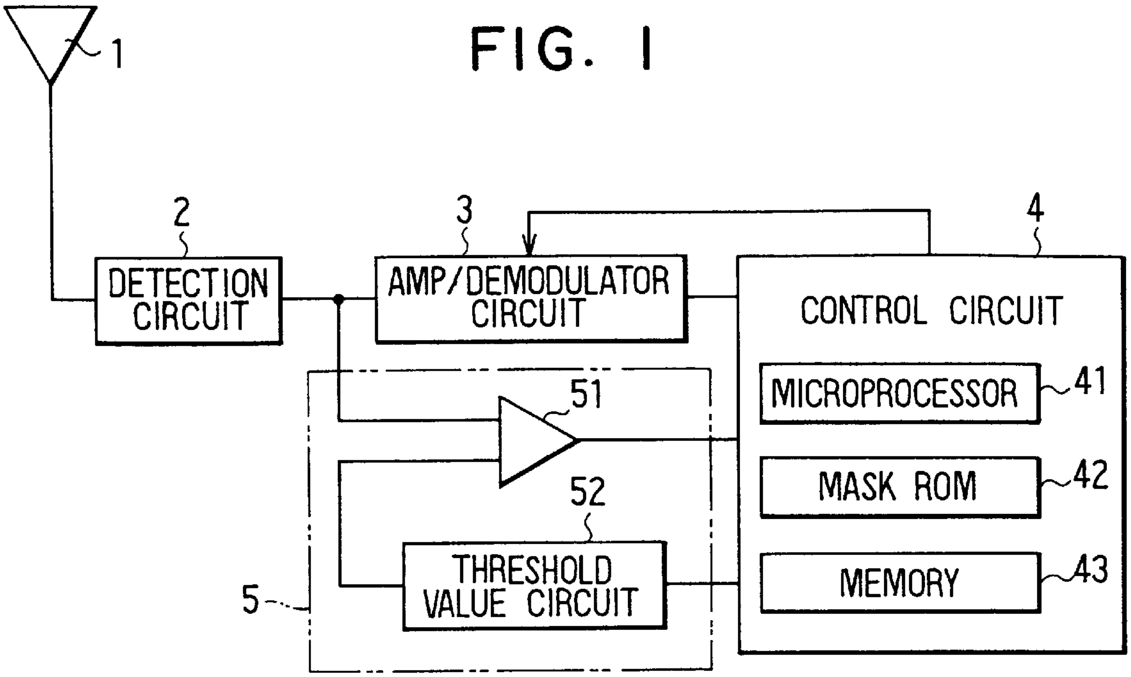
FIG. 1 is a block schematic diagram of a circuit that performs communication with a roadside device in a vehicle-mounted device according to a first embodiment of this invention.

Electronic components for forming a circuit that performs communication with a roadside device are mounted on the circuit board 13. FIG. 1 shows the essential structure of this circuit, which includes an antenna 1, a wave detection circuit 2, an amplifier/demodulator circuit 3, and a control circuit 4.

The control circuit 4 includes a microprocessor 41 that executes necessary processing for automatic collection of the toll. A mask ROM 42 stores a program for performing this processing, while a memory 43 stores various data, such as vehicle-mounted device ID numbers employed when communicating with the roadside device. Also, in a case where toll settlement is performed using a smart card, the control circuit 4 performs reading and writing from and to the smart card.

Herein, the vehicle-mounted device 10 is provided with an electric field-strength detecting circuit 5 to detect when the field strength of radio waves emitted from the roadside device reaches or exceeds the threshold value. This field-strength detecting circuit 5 includes a threshold-value circuit 52 and a comparator 51. The comparator 51 compares the field strength output from the detection wave circuit 2 with the threshold value output from the threshold-value circuit 52, and outputs an activating signal when the field strength reaches or exceeds the threshold value.

The control circuit 4 is structured to operate at a low power-consumption mode until an activating signal is output from the comparator 51, and to operate at a normal power-consumption mode when an activating signal is output from the comparator 51. For this reason, the control circuit 4 includes a circuit unit that switches between the low power-consumption mode and the normal power-consumption mode. This circuit unit, for example, actuates the circuit using a crystal-oscillator clock when in the normal power-consumption mode, and stops the crystal-oscillator clock when in the low power-consumption mode.

When operating in the low power-consumption mode, the control circuit 4 assumes a sleep state without actuating the amplifier/demodulator 3. When an activating signal is output from the comparator 51 and the normal power-consumption mode is enabled, the control circuit 4 actuates the amplifier/demodulator 3 and begins communication with the roadside device.

Consequently, when the field-strength detector 5 detects when the vehicle-mounted device 10 enters an area of communication with the roadside device, the vehicle-mounted device 10 is activated, communicates with the roadside device, and executes the necessary control for automatic collection of the toll.

Figure 3:
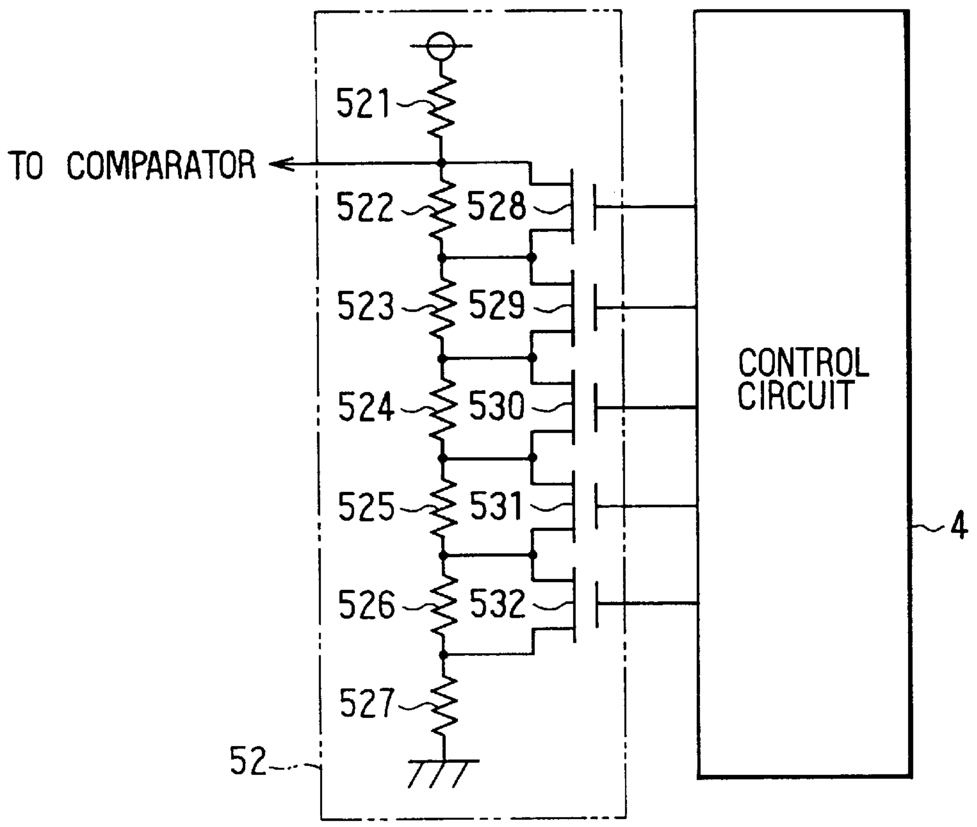
FIG. 3 is a circuit diagram of the threshold-value circuit shown in FIG. 1.

FIG. 3 shows the specific structure of the threshold-value circuit 52. The threshold-value circuit 52 is made up of a plurality of resistors 521–527 connected in series, and a plurality of MOS transistors 528–532 to switch the connected relationship among the several resistors. The threshold value of the voltage level established by switching the MOS transistors 528–532 on or off is output to the comparator 51.

Adjustment of the threshold value set at the threshold-value circuit 52 will be described next.

Figure 4:
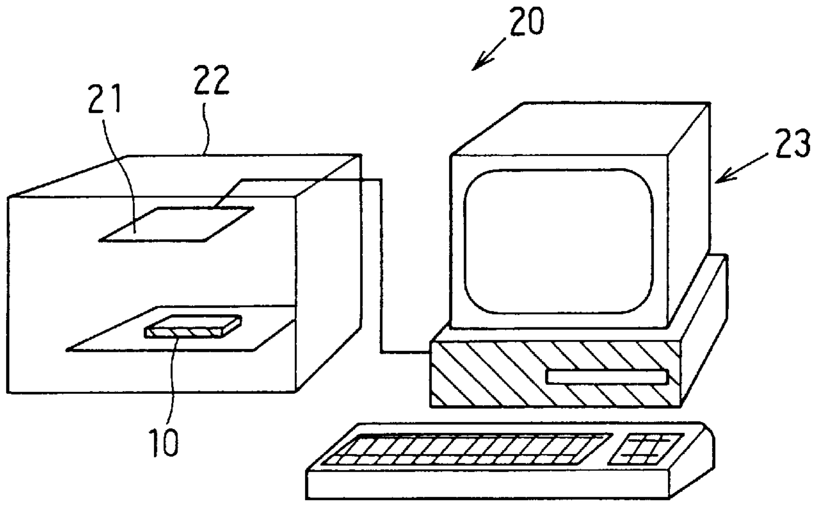
FIG. 4 is a front elevational view of a threshold-value adjusting device that performs threshold-value adjustment for the vehicle-mounted device.

FIG. 4 shows the structure of a threshold-value adjusting device 20 for performing threshold-value adjustment. This threshold-value adjusting device 20 comprises an electromagnetic-shield box 22 which is electromagnetically shielded and has an antenna 21 disposed in its interior, and a computer 23 for threshold-value adjustment. When performing threshold-value adjustment, the vehicle-mounted device 10 is disposed within the electromagnetic-shield box 22, and the threshold value of the vehicle-mounted device 10 is adjusted by wireless communication using radio waves between the threshold-value adjusting device 20 and the vehicle-mounted device 10.

Figure 5:
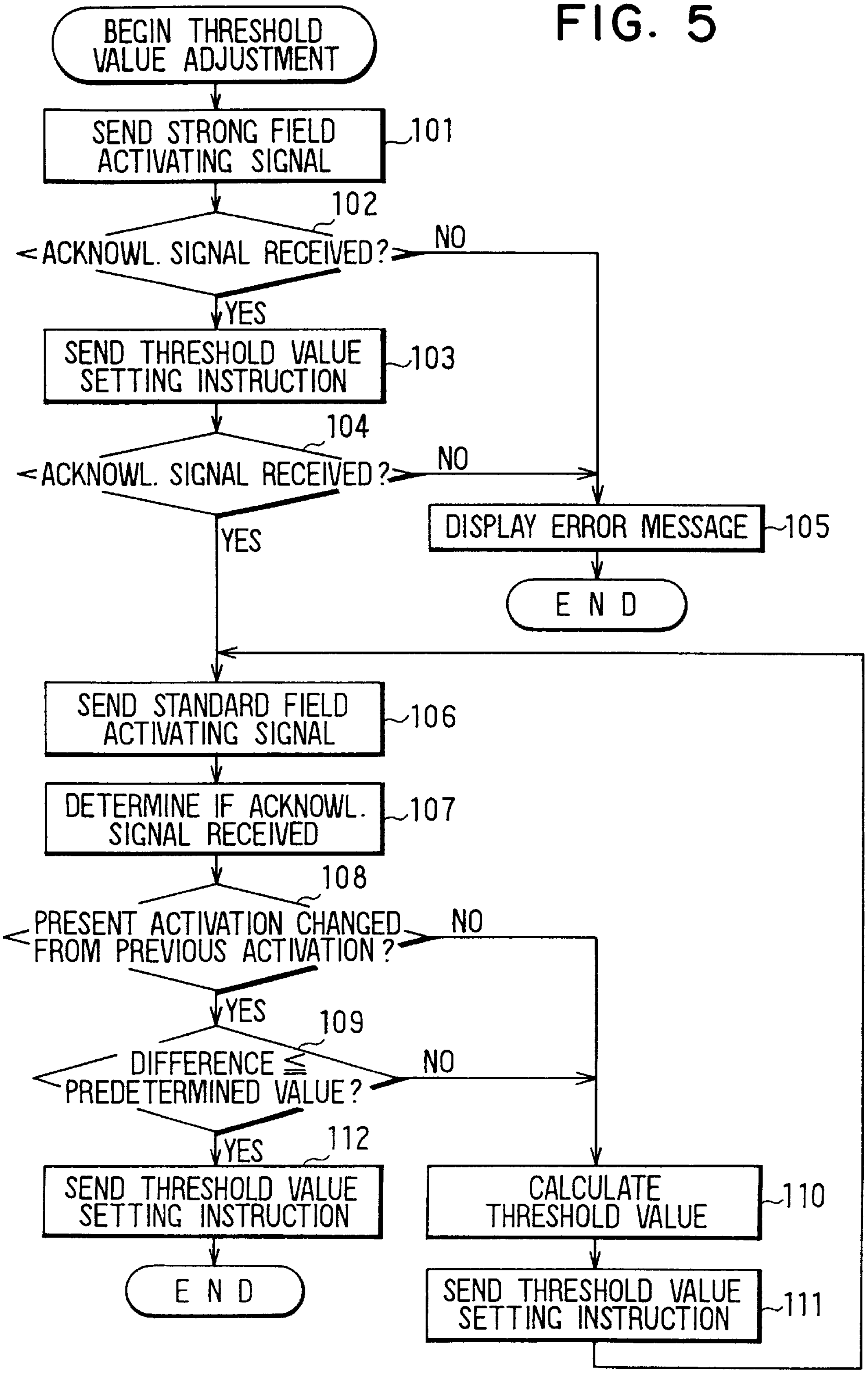
FIG. 5 is a flow diagram indicating processing of a computer for adjusting the threshold value in the threshold-value adjusting device shown in FIG. 4.
Figure 6:
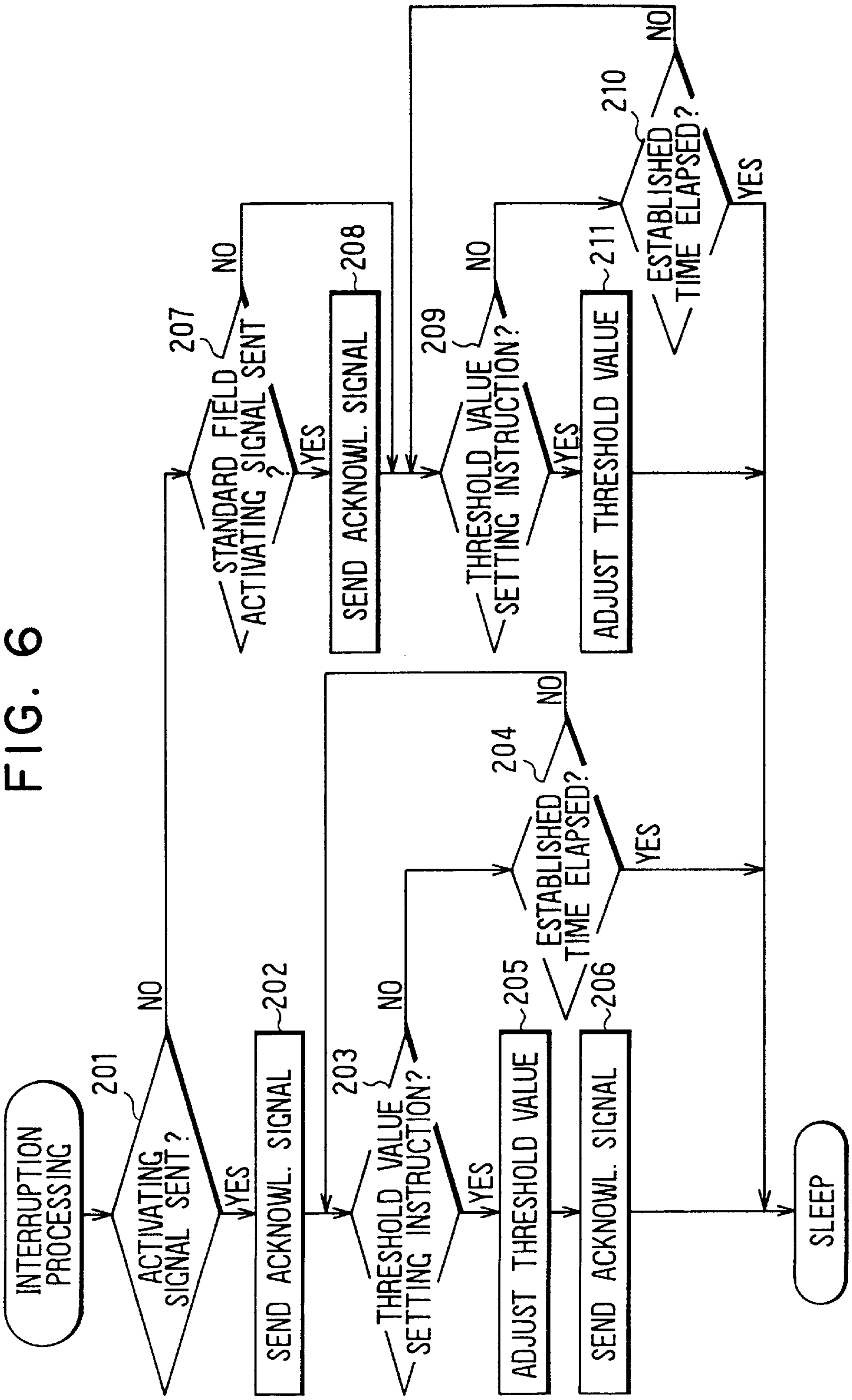
FIG. 6 is a flow diagram indicating processing of a microprocessor in the vehicle-mounted device.

FIG. 5 shows the processing performed by the computer 23 for threshold-value adjustment. FIG. 6 shows the processing performed by the microprocessor 41 in the vehicle-mounted device 10 during threshold-value adjustment.

At step 101, when beginning threshold-value adjustment, the computer 23 first sends a strong-field activating signal from the antenna 21 to the vehicle-mounted device 10. This strong-field activating signal has a field strength large enough to activate the vehicle-mounted device 10 no matter what the setting of the threshold value at the threshold-value circuit 52. Consequently, due to this strong-field activating signal, the comparator 51 outputs an activating signal, the control circuit 4 operates in the normal power-consumption mode, and the amplifier/demodulator 3 is actuated and enters an activated state capable of communication with an external area.

At this time, the microprocessor 41 executes the interrupt processing in FIG. 6 according to the activating signal from the comparator 51. First, at step 201, it determines whether a strong-field activating signal has been sent. At step 201, because a strong-field activating signal has been sent, the microprocessor 41 next sends an activation acknowledgement signal to the threshold-value adjusting device 20.

When the computer 23 determines at step 102 that this activation acknowledgement signal has been received, it sends a threshold-value setting instruction to the vehicle-mounted device 10 at step 103. In this case, the threshold value that has been set is between the maximum and minimum allowable threshold values set at the threshold-value circuit 52.

At step 203, after sending the activation acknowledgement signal, the microprocessor 41 determines whether a threshold-value setting instruction has been received. At step 204, the microprocessor determines whether the established time period for receiving the instruction has elapsed. When the microprocessor determines at step 203 that a threshold-value setting instruction has been received, at step 205, it adjusts the threshold value of the threshold-value circuit 52 according to this threshold-value setting instruction. Specifically, the microprocessor 41 selectively switches the MOS transistors 528–532 on or off, according to the threshold-value setting instruction, to set the threshold value. At step 206, the microprocessor 41 then sends a threshold-value adjustment acknowledgement signal to the threshold-value adjusting device 20, and thereafter places the control circuit 4 in a sleep state at step 206.

When the computer 23 determines at step 104 that a threshold-value adjustment acknowledgement signal has been received, it subsequently sends a standard-field activating signal to the vehicle-mounted device 10 at step 106. This standard-field activating signal corresponds to the field strength of the radio waves emitted from the roadside device.

The comparator 51 compares the field-strength value according to the standard-field activating signal with the threshold value set at the threshold-value circuit 52. In a case where the field-strength value is lower than the threshold value, the comparator 51 does not output an activating signal, and so the control circuit 4 remains in the sleep state. However, in a case where the field-strength value is higher than the threshold value, the comparator 51 outputs an activating signal, and so the control circuit 4 operates in the normal power-consumption mode.

Accordingly, the microprocessor 41 in the vehicle-mounted device 10 executes the interrupt processing of FIG. 6 according to the activating signal from the comparator 51. When it is determined at step 207 that a standard-field activating signal has been sent, the microprocessor 41 sends an activation acknowledgement signal to the threshold-value adjusting device 20 at step 208. Thereafter, at step 209, the microprocessor 41 determines whether a threshold-value setting has been received. The microprocessor also determines whether the established time for receiving the setting has elapsed at step 210.

At step 107, the computer 23 determines whether an activation acknowledgement signal has been sent from the vehicle-mounted device 10. Accordingly, at step 108, the computer 23 determines whether the activation of the vehicle-mounted device 10 changed between the previous activation processing (presence or absence of an activation acknowledgement signal received in response to the sent activation signal) and the present processing. In the initial activation processing, this determination is negative, and the threshold value is subsequently calculated at step 110.

In this calculation of the threshold value, the threshold value to be subsequently set is calculated based on whether an activation acknowledgement signal was received at step 107. Specifically, when an activation acknowledgement signal is received at step 107, it is determined that the previously set threshold value is low. Therefore, the threshold value is set at an intermediate value between the previously set threshold value and the minimum threshold value among the threshold values at which the vehicle-mounted device 10 has heretofore been activated (or, when these values are absent, the maximum value). Conversely, when an activation acknowledgement signal is not received, it is determined that the previously set threshold value is high. Therefore, the threshold value is set at an intermediate value between the previously set threshold value and the maximum value among those at which the vehicle-mounted device 10 has heretofore been activated (or, when these values are absent, the minimum value). That is to say, the threshold value is calculated according to the presence or absence of a received activation acknowledgement signal to cause the threshold value to converge to an appropriate value.

Accordingly, at step 110, a threshold-value setting instruction is sent to the vehicle-mounted device 10 according to this calculated threshold value. In this case, the threshold-value setting instruction is sent as a strong-field radio wave to activate the vehicle-mounted device 10, and to set the threshold value even when the vehicle-mounted device 10 has not theretofore been activated.

When the processing of step 209 and step 210 is repeated, or when the microprocessor 41 has not theretofore been activated and is activated by a threshold-value setting instruction, the microprocessor 41 determines at step 209 that a threshold-value setting instruction has been received. At step 211, the microprocessor then adjusts the threshold value of the threshold-value circuit 52 according to this threshold-value setting instruction.

Thereafter, the threshold value is adjusted to an appropriate value by repeating the above-described processing. Accordingly, when the computer 23 determines at step 108 that there has been a change in the presence or absence or activation of the vehicle-mounted device 10 between the previous activation processing and the present activation processing, and determines at step 109 that the difference between the previous activation processing and the present activation processing is less than or equal to a predetermined value, the threshold value is considered to have converged sufficiently to an appropriate value. At step 112, a threshold-value setting instruction for the threshold value at which the vehicle-mounted device 10 was last activated is then sent to the vehicle-mounted device 10, and the threshold-value adjustment processing is ended.

Additionally, at step 211, the microprocessor 41 in the vehicle-mounted device 10 adjusts the threshold value of the threshold-value circuit 52 to a threshold value corresponding to the threshold-value setting instruction. The microprocessor 41 stores this threshold value, the value at which the MOS transistors 528–532 in the threshold-value circuit 52 are switched on or off, in a nonvolatile memory such as an EEPROM.

Further, in the processing of the computer 23, when no activation acknowledgement signal from the vehicle-mounted device 10 is received in response to the sending of a strong-field activating signal, or when no threshold-value adjustment acknowledgement signal from the vehicle-mounted device 10 is received in response to a threshold-value setting instruction thereafter, the determination at step 102 or step 104 is negative. At step 105, an error is considered to have occurred in the vehicle-mounted device 10, and an error message is displaced on screen, and processing ends.

According to the above-described embodiment, a threshold value of the vehicle-mounted device 10 is adjusted by wireless communication from the threshold-value adjusting device 20 with the circuit board 13. Threshold-value adjustment is automatically performed. Moreover, the threshold value can be adjusted when it is determined that the case affects sensitivity.

Figure 7:
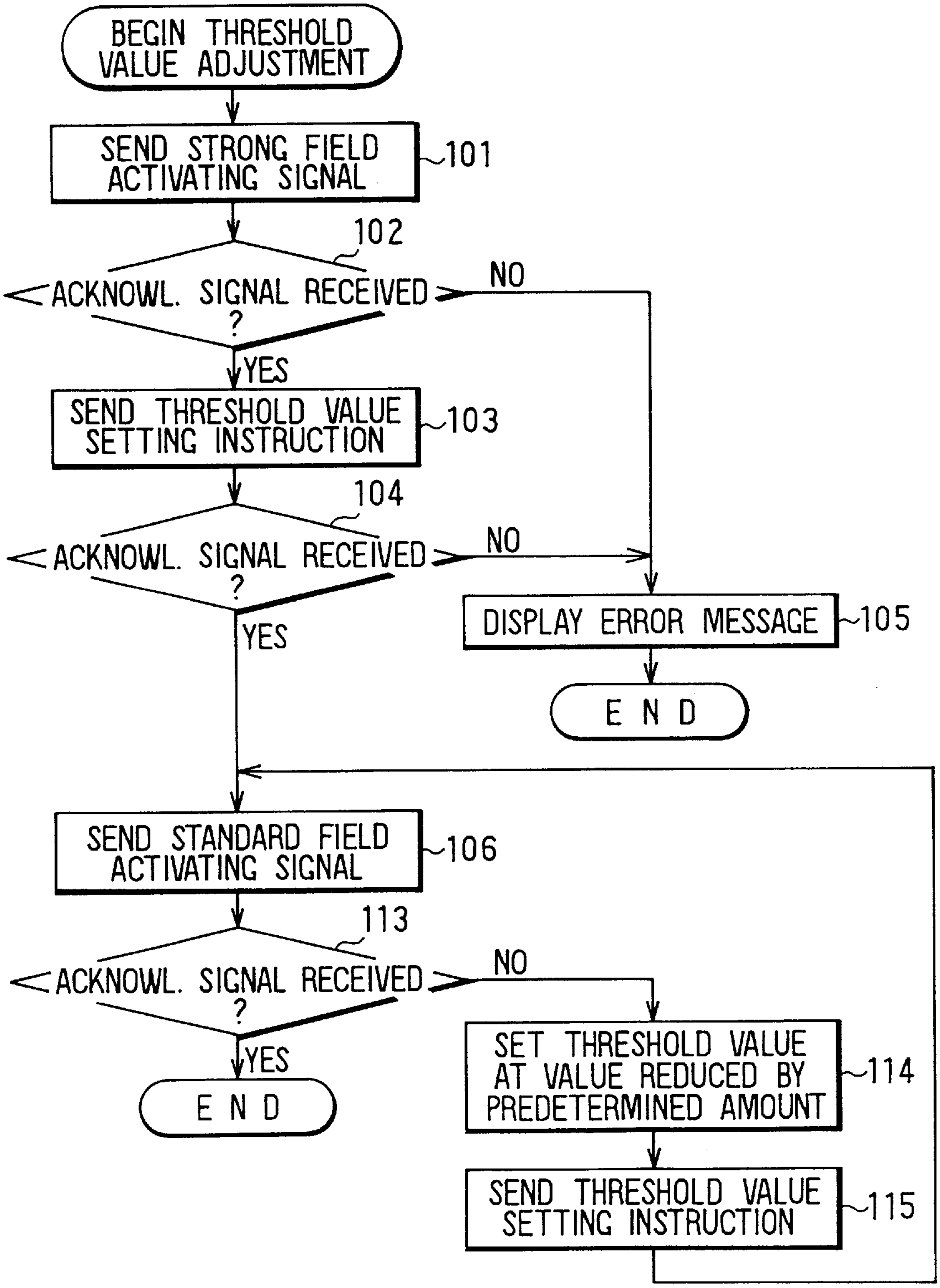
FIG. 7 is a flow diagram indicating other processing of the computer for adjusting threshold value in the threshold-value adjusting device.

In the above-described processing of the computer 23, the threshold value was set to as to converge on an appropriate threshold value in correspondence with the presence or absence of a received activation acknowledgement signal. However, it is also acceptable to raise the threshold value gradually from a minimum value and set it at a threshold value just before a value at which the activation acknowledgement signal cannot be received, or to lower the threshold value gradually from a maximum value and set it at a threshold value just before a value at which the activation acknowledgement signal can be received. FIG. 7 depicts the processing of the computer 23 in the latter case.

The processing of steps 101–106 shown in FIG. 7 is basically the same as the processing shown in FIG. 5. However, the threshold value set at step 103 is taken to be the maximum value. Accordingly, at step 106, a standard-field activating signal is sent to the vehicle-mounted device 10. In response to this, at step 113, it is determined whether the activation acknowledgement signal sent from the vehicle-mounted device 10 has been received. At step 114, when no activation acknowledgement signal is received, the threshold value is set at a value reduced by a predetermined value, and, at step 115, a threshold-value setting instruction corresponding thereto is sent to the vehicle-mounted device 10. Accordingly, the processing from step 106 to steps 113, 114, and 115 is repeated, and the threshold value set for the vehicle-mounted device 10 is gradually lowered by the predetermined value until an activation acknowledgement signal is received. When it is determined at step 113 that the activation acknowledgement signal has been received, the processing ends. In this case, the adjusted threshold value is set and stored in the vehicle-mounted device 10 according to the threshold-value setting instruction last sent.

With the above-described embodiment, threshold-value adjustment was performed using the threshold-value adjusting device 20 shown in FIG. 4. However, in a case where the vehicle-mounted device 10 is mounted on the dashboard or the windshield, it is possible that the strength of the field which the vehicle-mounted device 10 receives may vary due to differences in the shape of the hood or the composition of the windshield of the vehicle on which the vehicle-mounted device 10 is installed.

Figure 8:
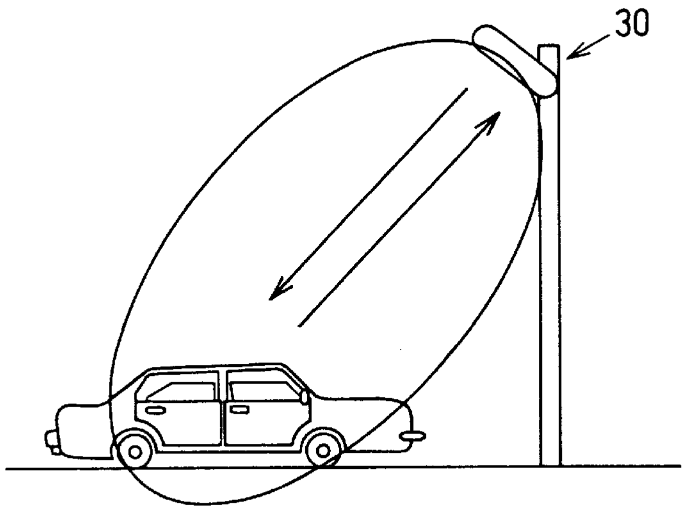
FIG. 8 is a side elevational view illustrating communication between the vehicle-mounted device and a roadside device for setting the threshold value.

In this regard, when a threshold-value setting roadside device 30 sends radio waves, as shown in FIG. 8, radio waves for an activating signal and a threshold-value adjusting instruction from this threshold-value setting roadside device 30 are sent from the device 30, and threshold-value adjustment is performed similarly to the threshold-value adjusting device 20 shown in FIG. 4. Thus, the threshold value can be adjusted with the vehicle-mounted device 10 in a mounted state on the vehicle. Because of this, adjustment of the threshold value can be performed with favorable accuracy without being affected by the environment when mounted on the vehicle.

Also, the roadside devices are established so that the field-strength distribution formed by the roadside devices is the same. However, but depending on the installation environment of the roadside device, there may be cases where the height of a roadside device's antenna differs, or a metallic structure exists near a roadside device, and the field strength formed by the roadside device thus deviates from the standard field strength. When such deviation in field strength occurs, the area of communication with the roadside device changes, even when the threshold-value described above is performed, and communication quality declines.

Figure 9:
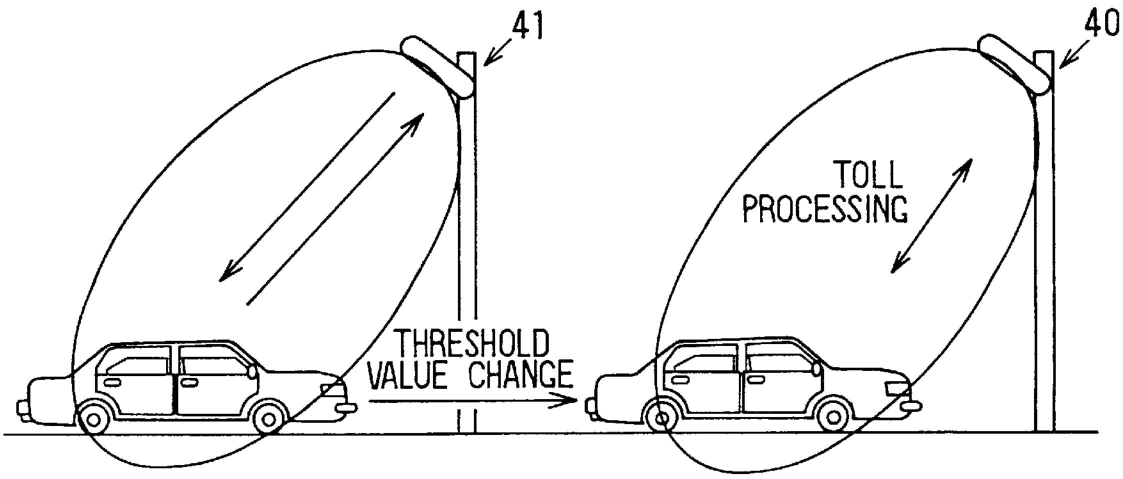
FIG. 9 is a side elevational view illustrating changing of the threshold value for the vehicle-mounted device according by a roadside device.

In this regard, field strength under the roadside device 40 performing toll collection (i.e., the portion through which the vehicle passes) is preliminarily measured, and the amount of threshold-value change to modify the threshold value of the vehicle-mounted device 10 is set according to the amount of deviation from the standard field strength, as shown in FIG. 9. Accordingly, a roadside device for threshold-value modifying use 41 is installed on the road upstream from the roadside device 40. When the vehicle passes the roadside device 41, radio waves for threshold-value modifying use are sent to the vehicle-mounted device 10 in accordance with the foregoing amount of threshold-value change. The vehicle-mounted device 10 receives these radio waves for threshold-value modifying use, modifies the threshold value, and sends a modification-completed signal. In this way, a threshold value suited to the installation environment of the roadside device 40 can be set by providing a roadside device for threshold-value modifying use.

In this case, the roadside device for threshold-value modifying use 41 may, in addition to modifying the threshold value, be provided with a function to send necessary information for automatic toll collection to the vehicle-mounted device 10.

Also, to obtain a communication area other than by providing a roadside device for threshold-value modifying use 41 separately from the roadside device 40, the desired communication area can be obtained by sending a strong-field activating signal in a predetermined direction of the road upstream from the roadside device 40, and performing communication with the roadside device 40 in a state where the vehicle-mounted device 10 has been previously activated by this signal.

What is claimed is:

1. A method of controlling communication between components in an automatic toll-collecting system, comprising:

providing a vehicle-mounted device that is activated upon receipt of activating signals at or above a threshold signal level;

providing a roadside device that selectively communicates with the vehicle-mounted device, and that includes a threshold-value adjusting device that is capable of adjusting the threshold signal level of the vehicle-mounted device;

sending an activating signal from the roadside device to the vehicle-mounted device when the vehicle-mounted device is within a predetermined range of the roadside device;

selectively adjusting the threshold level of the vehicle-mounted device based on the step of sending an activating signal; and sending a toll collecting signal, having a signal level closely corresponding to the adjusted threshold level of the vehicle-mounted device, from the roadside device to the vehicle-mounted device.

2. The method of claim 1, further comprising the step of sending an acknowledgment signal from the vehicle-mounted device to the roadside device to indicate activation thereof after the step of sending an activating signal.

3. The method of claim 2, wherein the step of selectively adjusting the threshold level of the vehicle-mounted device comprises:

sending a threshold level setting instruction from the roadside device to the vehicle-mounted device, after the step of sending an acknowledgement signal, to set the threshold signal level at a predetermined level;

sending a threshold level acknowledgement signal from the vehicle-mounted device to the roadside device to confirm receipt of the threshold level setting instruction;

sending a standard field activating signal from the roadside device to the vehicle-mounted device; and adjusting the threshold level of the vehicle-mounted device based on a response of the vehicle-mounted device to the step of sending a standard field activating signal.

4. The method of claim 3, wherein the step of adjusting the threshold level of the vehicle-mounted device comprises:

adjusting the threshold signal level upwardly if the vehicle-mounted device transmits an activation acknowledgement signal to the roadside device in response to the step of sending a standard field activating signal; and adjusting the threshold signal level downwardly if the vehicle-mounted device does not transmit an activation acknowledgement signal to the roadside device in response to the step of sending a standard field activating signal.

5. The method of claim 4, further comprising the step of repeating the steps of adjusting until the actual threshold signal level is within a predetermined threshold signal level range.

6. The method of claim 5, further comprising the step of sending a threshold value setting instruction from the roadside device to the vehicle-mounted device to set the threshold signal level once the actual threshold signal level is within the predetermined range.

7. The method of claim 1, wherein the step of selectively adjusting the threshold level of the vehicle-mounted device comprises adjusting the threshold level to account for deviation in field strength in the roadside device.

8. A method of controlling a vehicle-mounted device in an automatic toll collection system, comprising the steps of:

sending a strong field activating signal to the vehicle-mounted device;

sending a threshold value setting instruction upon receipt of the activating signal by the vehicle-mounted device;

sending a standard field activating signal, corresponding to a toll system signal, to the vehicle-mounted device upon receipt of the threshold value setting instruction by the vehicle-mounted device; and adjusting the threshold signal value of the vehicle-mounted device to closely correspond to the standard field activating signal to ensure toll system communication quality.

9. The method of claim 8, wherein the step of adjusting the threshold signal value comprises adjusting the threshold signal value of the vehicle-mounted device to a level that is between a maximum and a minimum allowable threshold level set at the vehicle-mounted device.

10. The method of claim 8, wherein the step of adjusting the threshold signal value comprises adjusting the threshold signal value of the vehicle-mounted device downwardly from a maximum threshold level set at the vehicle-mounted device.

11. The method of claim 8, wherein the step of adjusting the threshold signal value comprises adjusting the threshold signal value of the vehicle-mounted device upwardly from a minimum threshold level set at the vehicle-mounted device.

12. The method of claim 8, wherein the step of adjusting the threshold signal value of the vehicle-mounted device is performed after installation of the vehicle-mounted device.

13. A method of operation of a vehicle-mounted device in a toll collection system, comprising the steps of:

becoming activated upon receipt of a system activating signal;

adjusting a threshold signal upon receiving a threshold value setting instruction;

receiving a standard field activating signal corresponding to a toll collection device signal; and receiving a threshold value setting instruction, based on the step of receiving a standard field activating signal, that adjusts the threshold value to a level that ensures toll system communication quality.

14. An automatic toll collection system, comprising:

a toll collecting device that transmits a toll fare communication signal;

a vehicle-mounted device that communicates with the toll collecting device when the communication signal is at or above a predetermined threshold level; and a threshold value setting device associated with the toll collecting device that adjusts the threshold level of the vehicle-mounted device based on a level of the toll fare communication signal.

15. The system of claim 14, wherein the threshold value setting device is programmed to send a strong field activating signal to the vehicle-mounted device to activate the vehicle-mounted device, and the vehicle-mounted device is programmed to send an activation acknowledgement signal to the threshold value setting device in response to the strong field activating signal.

16. The system of claim 15, wherein the threshold value setting device is programmed to transmit a threshold value setting instruction to set the threshold signal level at a predetermined level after receiving the activation acknowledgement signal, and the vehicle-mounted device is programmed to transmit a threshold value acknowledgement signal after receiving the threshold value setting instruction.

17. The system of claim 16, wherein the threshold value setting device is programmed to transmit a standard field activating signal after receiving the threshold value adjustment acknowledgement signal, and to adjust the threshold signal level according to the vehicle-mounted device response thereto.

18. The method of claim 17, wherein the threshold value setting device repeatedly transmits the standard field activating signal until it determines that the threshold signal level is adjusted within a predetermined range, the threshold value setting device then transmitting a strong field threshold value setting instruction to the vehicle-mounted device.

19. The system of claim 14, wherein the threshold level setting device is located upstream from the toll collecting device to adjust the threshold signal level before the vehicle-mounted device enters a toll collecting device communication area.

20. The system of claim 14, wherein the vehicle-mounted device includes a threshold value circuit that adjusts the threshold level upon receipt of the threshold value setting instruction from the threshold level adjustment device.

21. The system of claim 14, wherein the threshold value circuit comprises:

a plurality of resistors connected in series; and a plurality of transistors associated with the plurality of resistors that are selectively switched on or off to switch a connected relationship among the plurality of resistors.

22. The system of claim 14, wherein the threshold value adjustment device comprises an electromagnetic shield box, an antenna operatively placed within the shield box to communicate with the vehicle-mounted device, and a radio wave generator connected to the antenna that generates radio signals transmitted by the antenna to the vehicle-mounted device to adjust the threshold signal level of the vehicle-mounted device.

23. The system of claim 14, wherein the vehicle-mounted device includes a housing, a circuit substrate mounted within the housing, and a communication circuit mounted to the substrate for communicating with the roadside device.

24. The system of claim 23, wherein the threshold value setting device adjusts the threshold level of the vehicle-mounted device after the communication circuit and the substrate are installed.

25. A method of adjusting a threshold value of a vehicle-mounted device employed in an automatic toll-collecting system, comprising the steps of:

providing a vehicle-mounted device that is activated upon receipt of activating signals at or above a threshold signal level;

providing a threshold value adjusting device that selectively communicates with the vehicle-mounted device, and that is capable of adjusting the threshold signal value of the vehicle-mounted device based on a toll collection signal strength;

sending an activating signal from the threshold value adjusting device to the vehicle-mounted device to activate the vehicle-mounted device;

sending a threshold value setting signal from the threshold value adjusting device to the vehicle-mounted device based on the step of sending an activating signal; and adjusting the threshold value at the vehicle-mounted device based on the step of sending a threshold value setting signal.

26. The method of claim 25, further comprising the step of sending an acknowledgment signal from the vehicle-mounted device to the threshold value adjusting device to indicate activation thereof after the step of sending an activating signal.

27. The method of claim 26, wherein the step of adjusting the threshold value of the vehicle-mounted device comprises:

sending a threshold value setting instruction from the threshold value adjusting device to the vehicle-mounted device, after the step of sending an acknowledgment signal, to set the threshold signal value at a predetermined level;

sending a threshold value acknowledgment signal from the vehicle-mounted device to the threshold value adjusting device to confirm receipt of the threshold value setting instruction;

sending a standard field activating signal from the threshold value adjusting device to the vehicle-mounted device; and adjusting the threshold value of the vehicle-mounted device based on a response of the vehicle-mounted device to the step of sending a standard field activating signal.

28. The method of claim 27, wherein the step of adjusting the threshold value of the vehicle-mounted device comprises:

adjusting the threshold signal value upwardly if the vehicle-mounted device transmits an activation acknowledgment signal to the threshold value adjusting device in response to the step of sending a standard field activating signal; and adjusting the threshold signal value downwardly if the vehicle-mounted device does not transmit an activation acknowledgment signal to the threshold value adjusting device in response to the step of sending a standard field activating signal.

29. The method of claim 28, further comprising the step of repeating the steps of adjusting until the actual threshold signal value is within a predetermined threshold signal value range.

30. The method of claim 29, further comprising the step of sending a threshold value setting instruction from the threshold value adjusting device to the vehicle-mounted device to set the threshold signal value once the actual threshold signal value is within the predetermined range.

31. The method of claim 25, wherein the step of selectively adjusting the threshold value of the vehicle-mounted device comprises adjusting the threshold value to account for deviation in toll collection signal strength.

* * * * *